(12) United States Patent
Kapusky et al.

(10) Patent No.: US 10,933,787 B2
(45) Date of Patent: Mar. 2, 2021

(54) HEAD RESTRAINT FOLLOWER

(71) Applicant: Adient Luxembourg Holding S.á r.l., Luxembourg (LU)

(72) Inventors: Michael Kapusky, South Lyon, MI (US); Eric Michalak, Canton, MI (US); Nathan Caruss, Ann Arbor, MI (US); Jennifer Carlson, Ypsilanti, MI (US); Brent Burton, Windsor (CA); Kurt Seibold, Farmington Hills, MI (US)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/326,086

(22) PCT Filed: Aug. 9, 2017

(86) PCT No.: PCT/US2017/046029
§ 371 (c)(1),
(2) Date: Feb. 15, 2019

(87) PCT Pub. No.: WO2018/034903
PCT Pub. Date: Feb. 22, 2018

(65) Prior Publication Data
US 2019/0184879 A1 Jun. 20, 2019

Related U.S. Application Data

(60) Provisional application No. 62/377,061, filed on Aug. 19, 2016.

(51) Int. Cl.
*B60N 2/862* (2018.01)
*B60N 2/22* (2006.01)
(Continued)

(52) U.S. Cl.
CPC .............. *B60N 2/862* (2018.02); *A47C 1/036* (2013.01); *B60N 2/10* (2013.01); *B60N 2/12* (2013.01); *B60N 2/2209* (2013.01); *B60N 2/806* (2018.02)

(58) Field of Classification Search
CPC ........ B60N 2/862; B60N 2/12; B60N 2/0745; B60N 2/2209; B60N 2/10; B60N 2/806;
(Continued)

(56) References Cited

U.S. PATENT DOCUMENTS 780,771 A * 1/1905 Axelrad ............. A47C 1/03238
297/343
912,214 A * 2/1909 Ward ..................... A61G 7/015
5/618
(Continued)

FOREIGN PATENT DOCUMENTS

WO 2015/175655 A1 11/2015
WO 2017/189404 A1 11/2017
(Continued)

*Primary Examiner* — Milton Nelson, Jr.
(74) *Attorney, Agent, or Firm* — Marshall & Melhorn, LLC

(57) ABSTRACT

Reclining seat mounted on a foundation through first and second slides. The seat cushion is mounted on the first slide, and the seat back is mounted on the second slide. The slides, the seat cushion and the seat back are arranged to move together as one unit to have the seat recline. A head restraint is mounted at a top side of the seat back to follow and move with the back during movement of the back. The second slide has a non-linear curved shape to rotate the head restraint when the seat back moves. The curved shape rotates the headrest in a backward and downward direction when the seat back moves downward and the seat cushion moves forward, and vice versa. From the different seat positions, (Continued)

the head restraint follows the motion of the occupant as they move to the different seat positions.

10 Claims, 3 Drawing Sheets

(51) Int. Cl.
*B60N 2/806* (2018.01)
*B60N 2/12* (2006.01)
*A47C 1/036* (2006.01)
*B60N 2/10* (2006.01)

(58) Field of Classification Search
CPC ........ B60N 2/885; B60N 2/809; A47C 1/036; A47C 7/38
USPC .......................................... 297/318, 343, 317
See application file for complete search history.

(56) References Cited

U.S. PATENT DOCUMENTS

| | | | |
|---|---|---|---|
| 2,634,796 A * | 4/1953 | Fischer | A47C 1/0325 297/343 |
| 2,925,122 A * | 2/1960 | Winick | A47C 1/032 297/318 |
| 3,572,829 A * | 3/1971 | Malitte | B64D 11/06 297/317 |
| 3,874,480 A | 4/1975 | Porter et al. | |
| 4,411,339 A | 10/1983 | Porter | |
| 4,425,987 A | 1/1984 | Porter | |
| 4,452,486 A * | 6/1984 | Zapf | A47C 1/032 297/317 |
| 4,457,406 A | 7/1984 | Porter | |
| 4,577,730 A | 3/1986 | Porter | |
| 4,880,084 A | 11/1989 | Tanaka et al. | |
| 5,058,954 A * | 10/1991 | Kan-Chee | B60N 2/242 297/284.11 |
| 5,150,771 A | 9/1992 | Porter | |
| 5,157,826 A | 10/1992 | Porter et al. | |
| 5,219,045 A | 6/1993 | Porter et al. | |
| 5,441,129 A | 8/1995 | Porter et al. | |
| 5,568,843 A | 10/1996 | Porter et al. | |
| 5,785,384 A * | 7/1998 | Sagstuen | A47C 1/032 297/317 |
| 5,794,470 A | 8/1998 | Stringer | |
| 5,918,940 A | 7/1999 | Wakamatsu et al. | |
| 6,776,454 B1 * | 8/2004 | Aubert | B60N 2/0292 297/216.19 |
| 7,090,240 B2 * | 8/2006 | Papac | A61G 5/12 280/250.1 |
| 7,585,018 B2 * | 9/2009 | LaPointe | A47C 1/0352 297/84 |
| 7,780,230 B2 | 8/2010 | Serber | |
| 8,038,220 B2 | 10/2011 | Liu et al. | |
| 8,899,674 B2 * | 12/2014 | Yagi | A47C 1/06 297/84 |
| 9,346,376 B2 | 5/2016 | Hiemstra | |
| 2008/0093502 A1 | 4/2008 | Bettell | |
| 2014/0300145 A1 | 10/2014 | Beroth et al. | |
| 2017/0313213 A1 * | 11/2017 | Meister | B60N 2/2209 |

FOREIGN PATENT DOCUMENTS

| | | |
|---|---|---|
| WO | 2018/013424 A1 | 1/2018 |
| WO | 2018/022275 A1 | 2/2018 |
| WO | 2018/034803 A1 | 2/2018 |

* cited by examiner

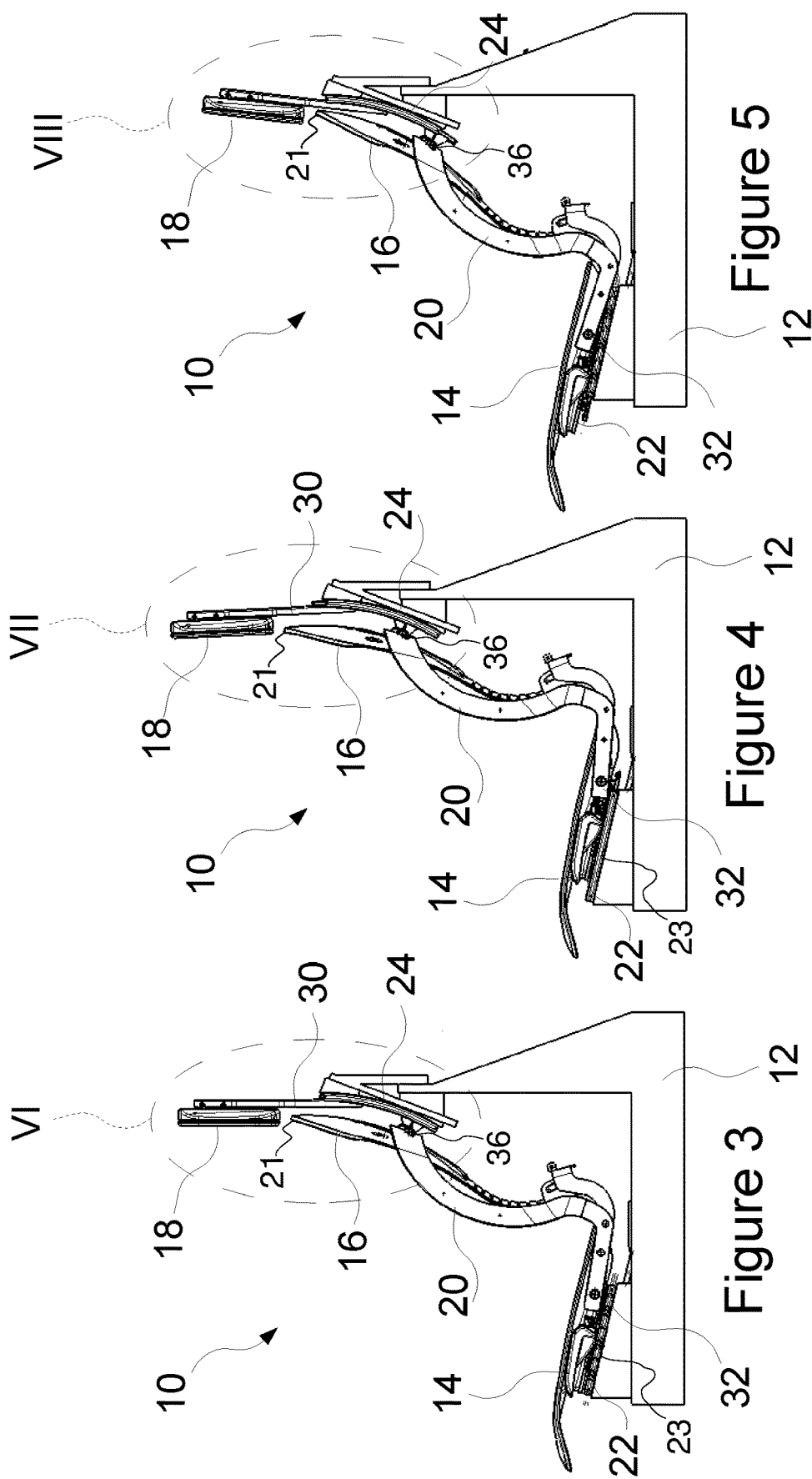

HEAD RESTRAINT FOLLOWER

CROSS REFERENCE TO RELATED APPLICATIONS

This application claims the benefit of priority of U.S. provisional application 62/377,061 filed Aug. 19, 2016, the entire contents of which are incorporated herein by reference.

FIELD OF THE INVENTION

The present invention relates to a head restraint for a seat, and in particular for a head restraint that follows a seat back, as the seat is movable into upright and reclining positions.

BACKGROUND OF THE INVENTION

It is often desirable for a seat to have a head restraint, especially when the seat is mounted in a motor vehicle that is subject to relatively large accelerations. The head restraint can prevent the head of the occupant from being thrown backwards and possibly causing injury to the occupant. Also the head restraint can provide resting support to the head of the occupant providing a more comfortable sitting experience. To further increase the comfort of the occupant, it is often desirable to have the seat recline, and to have the parts of the seat, especially to have the seat formed of very cushioning material.

Because of the amount of cushioning on the seat back, is often difficult to mount a head restraint directly to a seat back, especially to provide sufficient support to the head during accelerations of the seat/vehicle. Because of the reclining arrangements, mounting a head restraint directly to a foundation, is often disadvantageous, in that the head restraint will not follow the reclining seat and not be in an optimal position when the seat is reclined. Even if the head restraint is directly mounted to the seat back, the reclining arrangements often still do not position the head restraint in optimal position for the different reclined positions of the seat.

SUMMARY OF THE INVENTION

A reclining seat is mounted on a foundation through at least first and second slides which are spaced from each other. The seat has a seat cushion which has a generally horizontal top surface for providing mostly vertical support for a lower portion of the occupant/passenger. The seat cushion has a front side and a back side defining a forward/backward direction. The front side of the seat cushion being the side closest to the lower legs of the occupant/passenger, and the back side of the seat cushion being the side closest to the back of the occupant/passenger. The seat cushion is mounted on the first slide, and through the first slide, the seat cushion is slidably mountable on the foundation in the forward/backward direction.

The first slide can be a single unit movably connecting the seat cushion to the foundation. Alternatively, the first slide can be divided into two units positioned on the right and left, or lateral, sides of the seat cushion. Generally when the first slide is divided into two units, each unit is formed of upper and lower rails which slide relative to each other in the forward/backward direction.

The seat has a seat back with a generally vertical surface for providing horizontal support to an upper portion of the occupant/passenger. The seat back has a bottom side and a top side defining a lengthwise direction of the seat back, and the lengthwise direction extends back and forth between the top side and the bottom side of the seat back.

The bottom side of the seat back can be pivotally connected to the seat cushion, either directly to the back side of the seat cushion, or through a link arm to another portion of the seat cushion. The seat back is mounted on the second slide through which the seat back is slidably mountable on the foundation in generally the lengthwise direction. The slides, the seat cushion and the seat back are arranged to have the seat cushion and the seat back move together as one unit while the seat cushion generally moves in the forward/backward direction and the seat back moves in the lengthwise direction. A head restraint is mounted at the top side of the seat back to follow and move with the seat back during movement of the seat back in the lengthwise direction.

The second slide is mounted so that the seat back can follow the seat cushion as the seat cushion moves forward and back on the first slide. As the seat back follows the seat cushion during sliding of the seat cushion from back to front, the second slide slides the seat back in a downward and forward motion. This is done, to allow the occupant/passenger to be in more of a horizontal/resting position than in an upright position when the seat cushion is in the most rearward position. Very often, especially during long vehicle trips, the occupant/passenger prefers to change his or her seating position between a more upright position to a more horizontal/resting position, or to any of the practically infinite positions in between the upright and horizontal/resting position.

In order to help facilitate moving the occupant/passenger from the upright position to the resting position, the sliding motion of the seat cushion preferably has a vertical component. This can be accomplished by having the first slide mounted on an angle with respect to the horizontal. The first slide is then to be mounted so that when the slide is in the most forward position, the seat is in a higher position than when the slide is in the rearmost position. By moving the seat cushion in an upward direction as the seat cushion slides forward, the seat back does not need to move as far down in order to place the occupant/passenger in the horizontal/resting position. This reduces the amount of movement required between the upright and horizontal/resting position, and also reduces the amount of structure needed to perform the corresponding movement.

The second slide has a non-linear curved shape to rotate the head restraint when the seat back moves in the lengthwise direction. The curved shape rotates the headrest in a backward and downward direction when the seat back moves downward and the seat cushion moves forward, from the upright position to the horizontal/resting position. Likewise, the curved shape rotates the headrest in a forward and upward direction when the seat back moves upward and the seat cushion moves backward, from the horizontal/resting position to the upright position. From these different seat positions, and all the positions inbetween, the head restraint follows the motion of the occupant in the seat as they move to the different seat positions.

The second slide includes a first rail/track and a second rail/track slidably connected to each other along a curved path. The seat back is pivotally connected to the first rail to increase the amount that the seat back can rotate between the upright and rest positions, beyond just the rotation provided by the curved path. The second rail is to be mounted on the foundation. An attachment bracket connects the head restraint to the first rail of the second slide. The attachment bracket has a first end arranged below the top side of the seat back, and fixed to the first rail, preferably to be non-rotational. The attachment bracket has a second end arranged above the top side of the seat back and connected to the head restraint.

This arrangement allows the head restraint to move with the occupant as he/she moves to any of the practically infinite positions between the upright and rest position in the seat system. This type of seat that moves between such positions is often called a recliner/slouch seat system, and is a sliding system that moves with the natural kinematics of the occupant as he/she slouches. One advantage of this seat slide system is that it allows the occupant to recline (slouch) in a fluid motion that does not cause any shirt shear (back of shirt pulled from pants while reclining), or sheer in the head area of the occupant/passenger.

For this to happen, the head restraint and seat back must follow the seat cushion without the head restraint, seat cushion and the seat back changing positions relative to the occupant/passenger. The head restraint, seat cushion and the seat back must significantly follow the occupant/passenger through all of the practically infinite positions between the upright and resting position in order to avoid discomfort of the occupant/passenger as the occupant/passenger moves through all the positions between the upright position and the resting position, and vice versa. This slide system of the present invention offers infinite adjustment while still being strong enough to support an occupant/passenger in a motor vehicle, and while still being light enough and small enough to be practically incorporated into a motor vehicle.

A linear locking mechanism is provided next to each of the first and second slides, so that each slide can be locked into the exact position that the occupant desires. A possible linear locking mechanism is manufactured by Porter Systems LLC having an address at 28700 Cabot Drive, Suite 800 Novi, Mich. 48377. This locking mechanism offers infinite adjustment because it uses the forces created from two torsional springs working in tandem with two bushings to lock on a solid shaft. These linear locking devices are described further in U.S. Pat. Nos. 5,157,826, 5,794,470, 8,038,220, 5,794,470, 5,441,129, 5,219,045, 5,157,826, 5,15,0771, 4,880,084, 4,577,730, 4,457,406, 4,425,987, 4,411,339, 3,874,480, 5,568,843, which are herein incorporated by reference. Other linear and rotational locking mechanism could be used.

The design offers low release and sliding efforts with infinite adjustment. The head restraint, and its connection to the slide offers additional kinematics that allow the head restraint to follow the motion of the occupant during recline (slouch). This provides improved comfort and satisfaction for the occupant since the head restraint follows occupant motion, maintains smooth, low sliding efforts and low release efforts, maintains infinite adjustment, and maintains low cost due to simplified manufacturing and assembly process (no complex linkage systems or additional locking mechanisms added to get head restraint to follow seat back motion).

The head restraint can be made with movable portions to adjust the position of the head and to control lateral movement as disclosed in PCT Patent Publication WO 2015 175 655 A1, and Applicant's copending PCT Patent Application PCT/US17/43620 corresponding to U.S. Provisional Application 62/377,093, all of which are incorporated herein by reference in their entirety.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 3 is a side schematic view of the seat of the present invention, with the seat in a design or neutral position;

FIG. 4 is a side schematic view of the seat of the present invention, with the seat in the full upright position;

FIG. 5 is a side schematic view of the seat of the present invention, with the seat in the full recline position;

DESCRIPTION OF THE PREFERRED EMBODIMENTS

Figure 2:
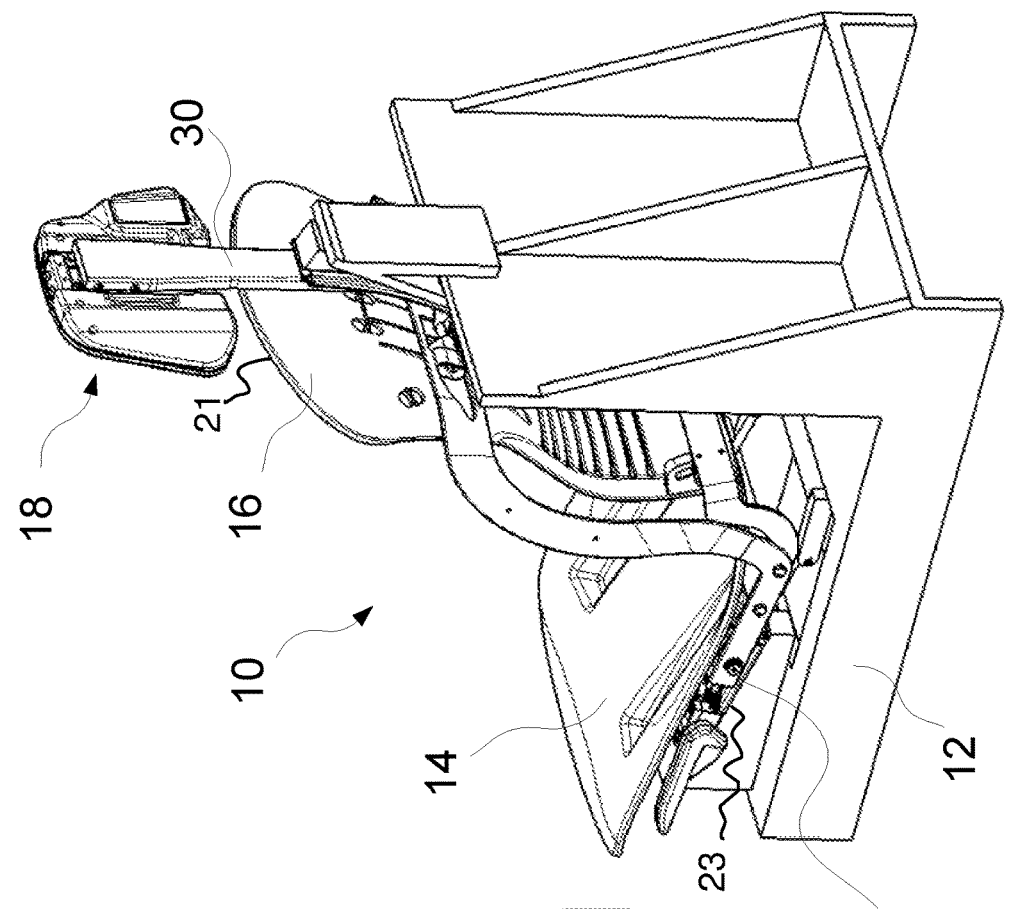
FIG. 2 is a rear side perspective schematic view of the seat of the present invention mounted on a foundation.
Figure 1:
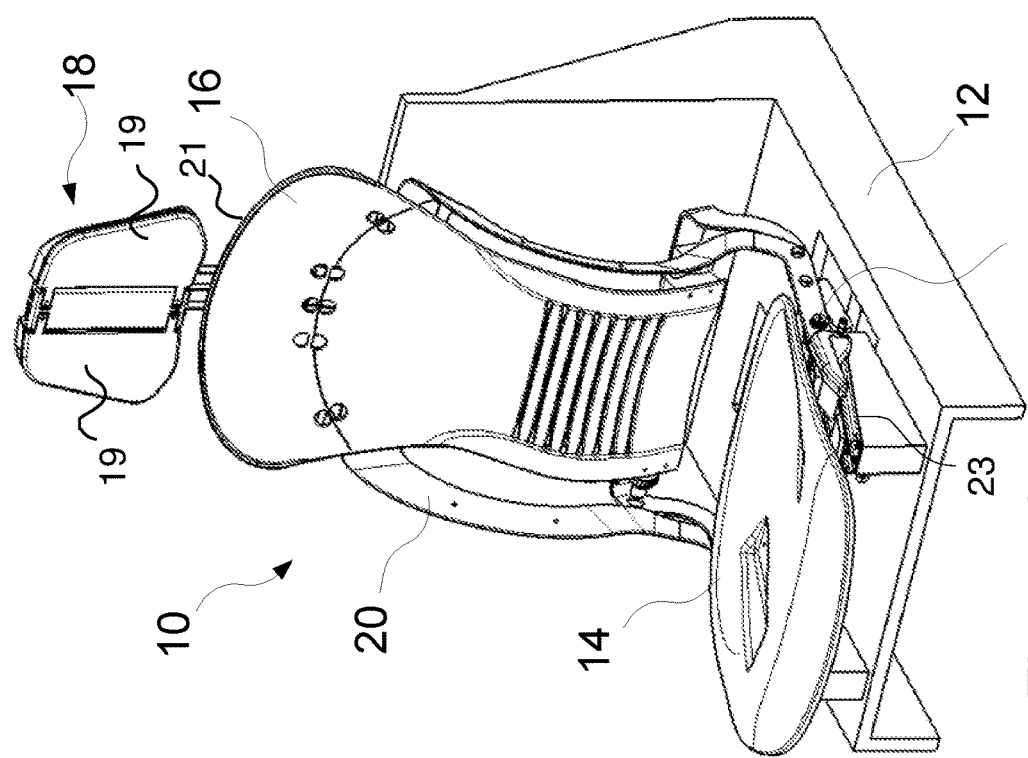
FIG. 1 is a front side perspective schematic view of the seat of the present invention mounted on a foundation.

Referring to the drawings in particular, FIG. 1 shows a seat 10 mounted on a foundation 12. The seat 10 includes a seat cushion 14 and a seat back 16. The seat back 16 is pivotally connected to the seat base 14. This pivotal connection can be a connection through a link arm 20, or the seat back 16 can be pivotally connected to the seat base 14 through a connection such as disclosed in U.S. Pat. No. 9,346,376, which is hereby incorporated by reference in its entirety.

The seat 10 can be arranged to be a type of seat as indicated by the term "slouch seat". Such a slouch seat has the seat cushion 14, the seat back 16, the foundation 12, and structure connecting all of these parts to form a seat 10 that moves from an upright position as shown in FIG. 4, to a more horizontal/rest position as shown in FIG. 5. The degree to which the slouch seat becomes horizontal, depends on the application where the seat will be mounted. In applications where the seat has sufficient legroom, the slouch seat can become very horizontal. In other applications, such as economy class or in the driver's seat of a vehicle, less movement into a horizontal position is desired.

The arrangement of such a slouch seat is described in Applicant's copending PCT patent applications PCT/US17/29073 (corresponding to U.S. Provisional Patent Application 62/329,551), PCT/US17/41151 (corresponding to U.S. Provisional Patent Application 62/362,241), and PCT/US17/41105 (corresponding to U.S. Provisional Patent Application 62/367,903), all of which are incorporated herein by reference in their entirety.

A head restraint 18 is arranged above the seat back 16 to provide a support for the head of the occupant of the seat 10. This support can be as minor as a place for the head to rest and provide comfort to the occupant/passenger. The support provided is often desired to be more significant, such as providing support to the head when the seat 10 undergoes large accelerations, especially in the forward direction, such as when the seat 10 is mounted in a vehicle.

Large forward accelerations of the vehicle push the seat against the occupant/passenger, and if sufficient support is not provided to the head of the occupant/passenger, then the head will be forced backward during the forward acceleration. In order to avoid/minimize injury to the occupant, the head restraint needs to provide the same support/force/push to the head that the rest of the seat applies to the body of the occupants/passenger.

The head restraint 18 can also have wings 19 which rotate about a centrally positioned vertical axis to provide lateral support to the head of the occupant, during lateral accelerations, such as during turning motions of the vehicle, and especially at high speed turning motions. The arrangement of the head restraint 18, specifically with regard to the wings 19 is described in Applicant's copending PCT Patent Application PCT/US17/43620, which has been previously cited.

The seat 10 is overall a recliner type seat, and preferably where the reclining motion is formed by both the seat cushion 14 and the seat back 16 sliding in a front to back or lengthwise direction. FIGS. 3 through 5 show the different positions of the slouch seat. FIG. 3 shows the seat 10 in a position called a design position, a neutral position, and/or basic position. This position is chosen to be somewhere between a fully upright position, and a fully reclined/rest position. The fully reclined/rest position depending of course on the application for which the seat is to be applied.

The seat base 14 is slidably connected to the foundation 12 through a first slide 22. The seat back 16 is a slidably connected to the foundation 12 through a second slide 24. The seat back 16 is connected to the second slide 24 by a pivot connection 36. This allows the seat back 16 to better follow the seat cushion 14 in the movement between the fully upright position and the reclined position, and keep the parts of the seat 10 in a relatively fixed contact with the respective parts of the occupant/passenger during movement between the positions. Further details regarding the structure of the first and second slide 22, 24 and their connections between the seat base 14, seat back 16, and foundation 12 are disclosed in Applicant's co-pending U.S. patent application Ser. No. 62/362,241 which has been previously cited.

FIG. 4 shows the seat 10 in the full upright position. The seat base 14 has been moved rearward, or to the right in FIG. 4, relative to FIG. 3. The seat back 16 has moved higher, and in a slightly counter clockwise direction in FIG. 4, relative to FIG. 3. Depending on the occupant/passenger, this position may be more desirable than the neutral or design position shown in FIG. 3. FIG. 5 shows the seat 10 in the full recline position. The seat base 14 has been moved to its full extent forward, or to the left in FIG. 5, relative to FIGS. 3 and 4. Likewise, the seat back 16 has been moved to its lowest position relative to FIGS. 3 and 4.

It is desirable for the head restraint 18 to move with the rest of the seat 10 so that the head restraint 18 can provide the support to the head for both comfort reasons, and to prevent injury during large accelerations, both forward and lateral, at all the positions of the seat 10 between the fully upright position as shown in FIG. 4, and the fully reclined position, for example as shown in FIG. 5.

For many reasons, it is sometimes disadvantageous for the head restraint 18 to be directly connected to the seat back 16, such as being mounted directly to the top 21 of the seat back 16. One reason being that the seats for vehicles are often desired to be light weight to increase the fuel economy of the vehicle, and the seats are desired to be made to take up as little space as possible, in order to provide room for more desirable uses for the space. As such, the top 21 of the seat back 16 is preferably designed to just provide support for the upper back of the occupant/passenger. This then does not provide sufficient support on the seat back 16 for a head restraint 18, especially when significant support is needed for the safety of the head of the occupant during large accelerations of the vehicle in which the seat 10 is mounted.

The head restraint 18 is therefore mounted in the present invention more directly to the second slide 24, than to the seat back 16. This is preferably done through an attachment bracket 30. In a particular type of slouch seat, the seat base 14 is connected to the seat back 16 by a link arm 20. The link arm 20 is pivotally connected to the seat back 16 through a pivot connection 36, which also preferably connects the seat back 16 to the second slide 24. The link arm 20 is connected to the seat base 14 through a pivot point 32.

The seat 10 has lateral sides which correspond to the right and left sides of the occupant/passenger. These lateral sides are arranged perpendicularly spaced from the forward/backward direction and the lengthwise direction. The second slide 24 is preferably arranged as a single slide in the lateral center or lateral middle area of the seat back 16. In the preferred embodiment, there is a link arm 20 arranged on each of the right and left, or lateral sides, of the seat 10.

The first slide 22 preferably is formed from two subassemblies 23, where only the left subassembly 23 is visible in the drawings. Each subassembly 23 is arranged at the lateral sides of the seat cushion 14. The lateral sides of the seat cushion 14 corresponding to the right and left sides of the occupant/passenger. The two subassemblies 23 of the first slide 22 being arranged closer to the lateral sides and than to a lateral center or lateral middle of the seat cushion 14. Each of the link arms 20 being connected to a different one of the two subassemblies 23 of the first slide 22.

Because of the pivoting connections 36 and 32 between the seat back 16, and the seat cushion 14, especially through the link arm 20, and the pivoting connection 36 between the seat back 16, link arm 20 and the second slide 24, a direct straight sliding of the head restraint 18 to the slide 24 will not necessarily always have the head restraint 18 desirably follow the movement of the seat back 16. By curving the second slide 24 so that the second slide 24 follows a curved, nonlinear, path, the head restraint 18 can more desirably follow the seat back 16 during movements of the seat 10 between the full recline and full upright positions.

Figure 8:
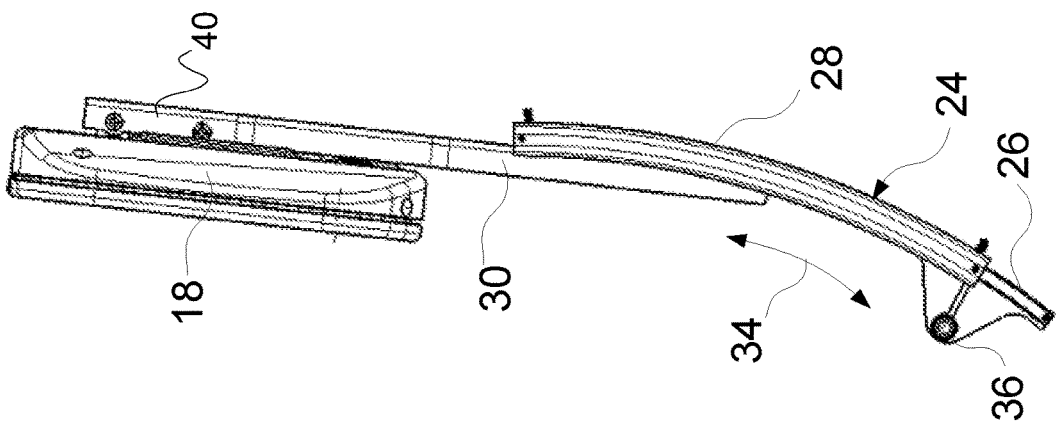
FIG. 8 is an enlarged schematic view of the portion VIII indicated in FIG. 3.
Figure 7:
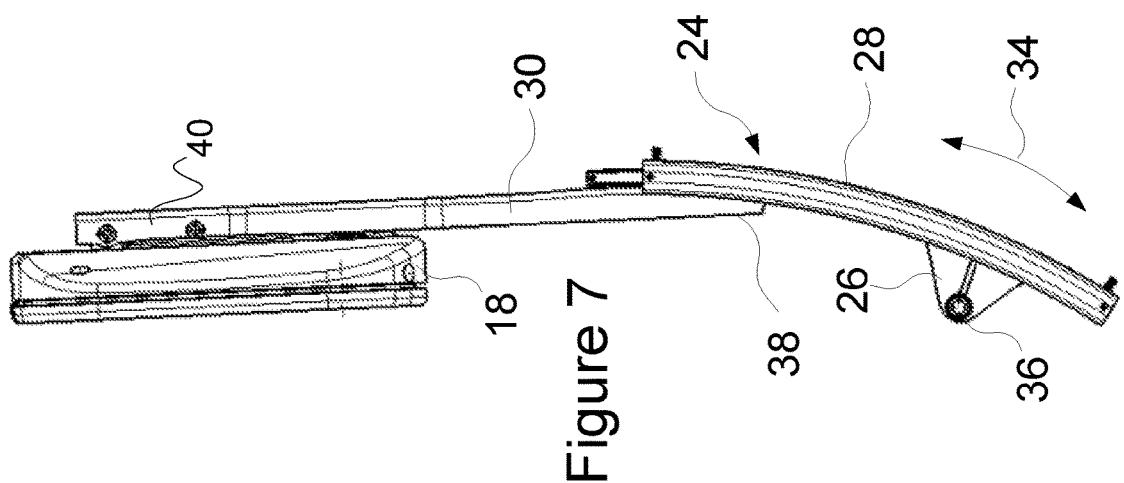
FIG. 7 is an enlarged schematic view of the portion VII indicated in FIG. 3.
Figure 6:
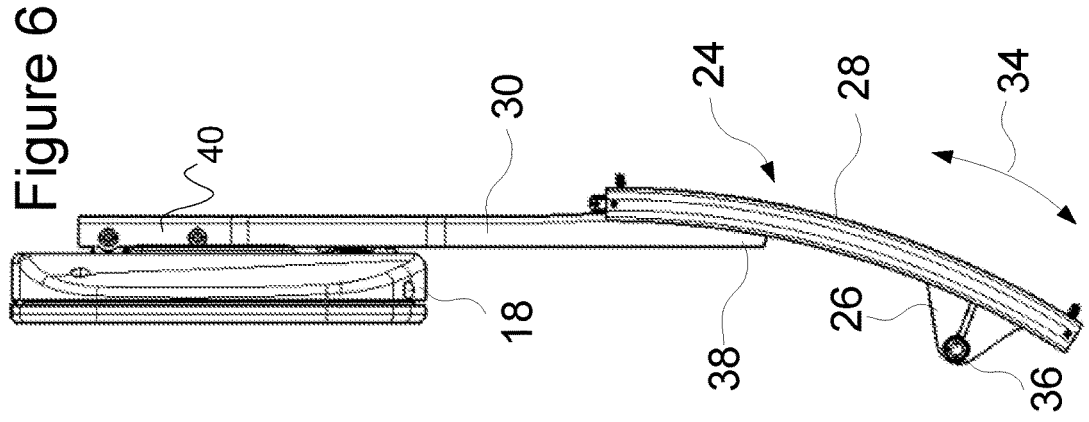
FIG. 6 is an enlarged schematic view of the portion VI indicated in FIG. 3.

As shown in FIGS. 6-8, the second slide 24 has a first rail/track 26 which is slidably connected to a second rail/track 28. In the embodiment of FIGS. 6-8, the first rail 26 slides inside the second rail 28, however this could be reversed, and other slidable connections between the first rail 26 and the second rail 28 are possible. For example PCT patent application PCT/US17/41105, previously cited, discloses a type of slide. The first rail 26 and the second rail 28 are connected to slide along a curved path similar to the arrows 34 shown in FIGS. 6-8.

The seat back 16 is connected to the first rail 26 at the pivoting connection 36, which is preferably also a pivotal connection for the link arm 20. The head restraint 18 is connected to the first rail 26 through an attachment bracket 30 having an elongated shape. One end 38 of the attachment bracket 30 is connected to the first rail 26, and another axially opposite end is connected to the head restraint 18. The attachment bracket 30 has a sufficient axial length in order to position the entire head restraint 18 above the top 21 of the seat back 16, and in a position to support the head of the occupant/passenger. The attachment bracket 30 can have adjustment structure to just the axial length of the attachment bracket 30 in order to adjust the position of the head restraint 18 to provide comfort and support to occupant/passengers of different sizes. In the alternative, the head restraint 18 can be adjustable in the generally vertical direction by means of its own structure, which is separate from the attachment bracket 30. Such structure is disclosed in PCT/US17/43620, which has been previously cited.

The second rail 28 of second slide 24 is mounted on the foundation 12. The one end 38 of the attachment bracket 30 is fixed to the first rail 26 at a bracket point that is spaced from the connection pivot point 36 along a lengthwise direction of the first rail 26. The spacing is preferably chosen so that the connection pivot point 36 is at one axial end of the second rail 28, and the one end 38 of the attachment bracket 30 is at another axially opposite end of the second rail 28. This spreads the load of the headrest 18 and the seat back 16 across the entire length of the second rail 28. This also places the attachment bracket 30 and the head restraint 18 at a different position on the curved path of the second slide 24. In particular, the attachment bracket 30 will always be in a more vertical direction of the second slide 24, which puts the headrest 18 in a more favorable position to support the occupant/passenger.

In the alternative, the end 38 of the attachment bracket 30 could be directly connected to the connection pivot point 36 and the attachment bracket 30 could have a curved shape to properly position the head restraint 18 to support the head of the occupant/passenger. Still furthermore, the attachment bracket 30 could both have a curved shape, and the end 38 spaced from the connection pivot point 36, so that the combination properly positions the head restraint 18 in all positions of the seat 10 between the full upright position, and the recline position.

The connections and the curved path are arranged to have the head restraint 18 rotate when the seat back 16 moves in the lengthwise direction. The curved path rotates the headrest 18 in a backward and downward direction when the seat back 16 moves downward and the seat cushion 14 moves forward. The curved path/shape rotates the headrest 18 in a forward and upward direction when the seat back 16 moves upward and the seat cushion 14 moves backward. The degree of curvature, the spacing between the connection pivot point 36 and the one end 38 of the attachment bracket 30, and optionally any curve in the attachment bracket 30 are chosen to keep the head restraint 18 and the seat back 16 always in fixed contact with their respective parts of the occupant, and to avoid having the head restraint 18, or the seat back 16 slide against the occupant as the seat moves between the full upright position and the recline position.

This is one method for linking a head restraint 18 to the motion of the seat 10. There could be other methods or additional mechanisms/links added to the seat 10 to get the head restraint 18 to follow the motion of the occupant as he/she changes positions While specific embodiments of the invention have been shown and described in detail to illustrate the application of the principles of the invention, it will be understood that the invention may be embodied otherwise without departing from such principles.

LIST OF REFERENCE CHARACTERS

10 Seat
12 foundation
14 seat cushion
16 seat back
18 head restraint
19 head restraint wings
20 link arm
21 seat back top
22 first slide
23 subassembly of first slide
24 second slide
26 first rail
28 second rail
30 attachment bracket
32 pivot point
34 curved path
36 connection point
38 one end of attachment bracket
40 another end of attachment bracket

What is claimed is:

1. A reclining seat for mounting on a foundation, the reclining seat comprising:
  a first slide mountable on the foundation;
  a second slide mountable on the foundation;
  a seat cushion having a front side and a back side defining a forward/backward direction, said seat cushion being mounted on said first slide, said seat cushion being slidably mountable on the foundation through said first slide in said forward/backward direction;
  a seat back having a bottom side and a top side defining a lengthwise direction extending back and forth between said top side and said bottom side, said bottom side of said seat back being pivotally connected to said seat cushion, said seat back being mounted on said second slide to be slidably mountable on the foundation through said second slide in said lengthwise direction, said slides, said seat cushion and said seat back being arranged to have said seat cushion and said seat back move together as one unit while said seat cushion moves in said forward/backward direction and said seat back moves in said lengthwise direction;
  a head restraint mounted at said top side of said seat back to follow and move with said seat back during movement of said seat back in said lengthwise direction;
  wherein said second slide includes a first rail and a second rail slidably connected to each other along a curved path;
  wherein an attachment bracket connects said head restraint to said first rail of said second slide;
  said seat back is pivotally connected to said first rail at a pivot point;
  a first end of said attachment bracket is fixed to said first rail at a bracket point, said pivot point and said bracket point being spaced from each other along an lengthwise direction of said first rail.

2. A reclining seat in accordance with claim 1, wherein: said second slide has a non-linear curved shape to rotate said head restraint when said seat back moves in said lengthwise direction.

3. A reclining seat in accordance with claim 2, wherein: said curved shape rotates said head restraint in a backward and downward direction when said seat back moves downward and said seat cushion moves forward; said curved shape rotates said head restraint in a forward and upward direction when said seat back moves upward and said seat cushion moves backward.

4. A reclining seat in accordance with claim 1, wherein: said seat back being pivotally connected to said first rail, said second rail adapted to mount on the foundation.

5. A reclining seat in accordance with claim 4, wherein: said first end of said attachment bracket is arranged below said top side of said seat back and fixed to said first rail, said attachment bracket having a second end arranged above said top side of said seat back and being connected to said head restraint.

6. A reclining seat in accordance with claim 5, wherein: said curved path is arranged to rotate said head restraint when said seat back moves in said lengthwise direction.

7. A reclining seat in accordance with claim 6, wherein: said curved path rotates said head restraint in a backward and downward direction when said seat back moves downward and said seat cushion moves forward; said curved shape rotates said head restraint in a forward and upward direction when said seat back moves upward and said seat cushion moves backward.

8. A reclining seat in accordance with claim 4, wherein: said seat back is pivotally connected to said first rail at a pivot point; a link arm pivotally connects said seat back to said seat cushion, said link arm extending from said pivot point to said seat cushion.

9. A reclining seat in accordance with claim 8, wherein: said seat back having lateral sides arranged perpendicularly spaced from said forward/backward direction and said lengthwise direction; said second slide being arranged closer to a lateral center of said seat back than to said lateral sides.

10. A reclining seat in accordance with claim 9, wherein: said link arm is arranged on one of said lateral sides of said seat back; another link arm is arranged on another one of said lateral sides of said seat back, said another link arm pivotally connecting said seat back to said seat cushion, said another link arm extending from said pivot point to said seat cushion.

\* \* \* \* \*